April 12, 1966   R. A. RATCLIFF   3,245,660
POSITIVE HOLDING FRICTION BRAKE HOIST
Filed Dec. 18, 1961                                      2 Sheets-Sheet 2
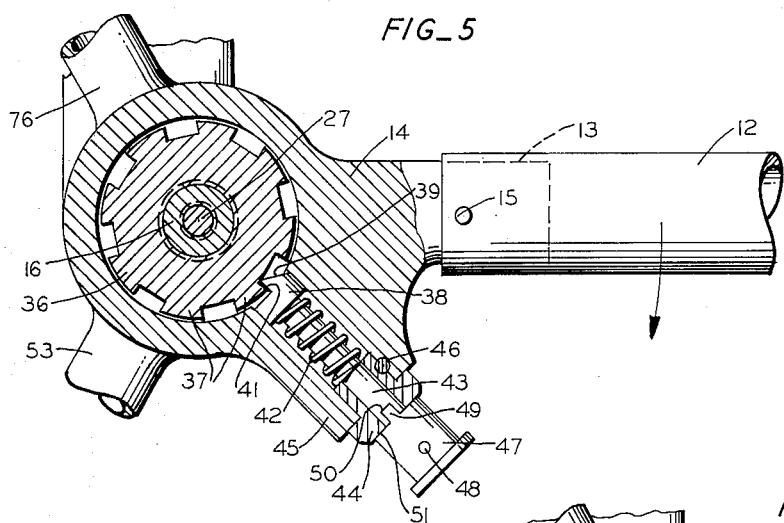
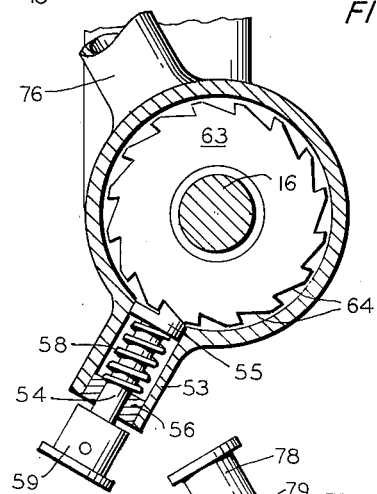
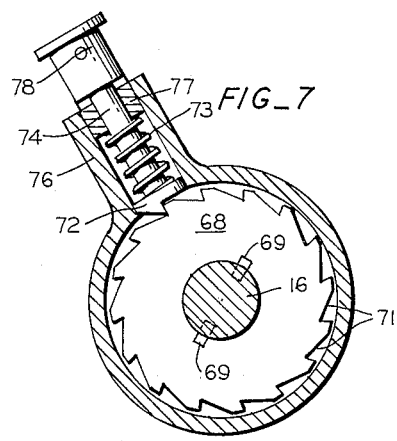
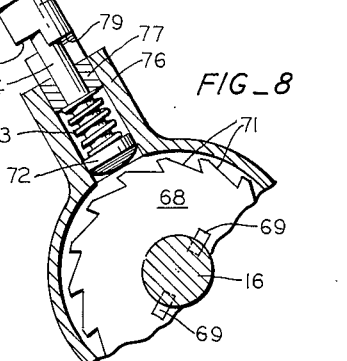
INVENTOR.
RALPH A. RATCLIFF
BY
Bialos & Schlemmer
ATTORNEYS United States Patent Office 3,245,660
Patented Apr. 12, 1966

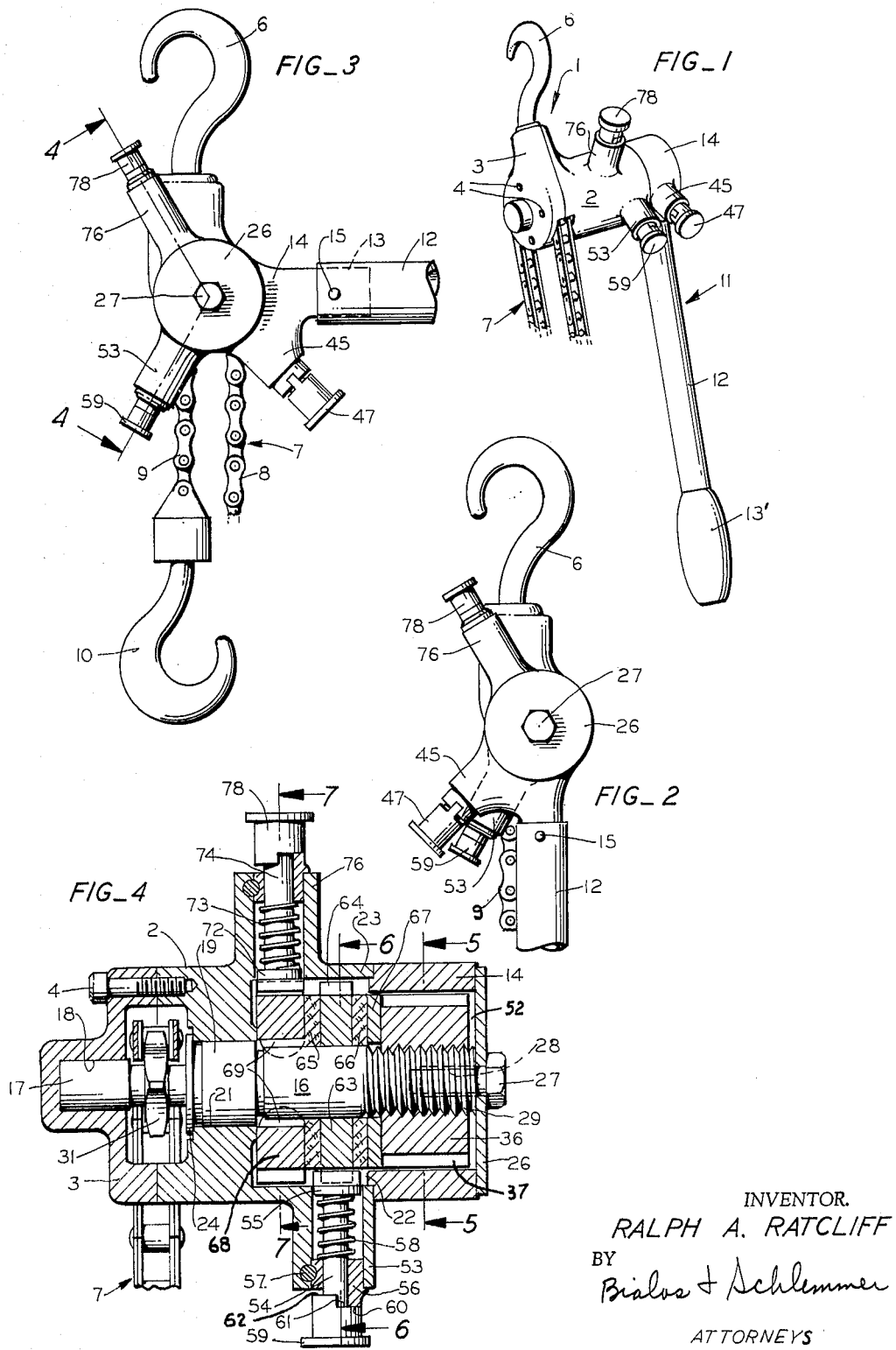

3,245,660
POSITIVE HOLDING FRICTION BRAKE HOIST
Ralph A. Ratcliff, 1300 Sunnyslope Ave., Belmont, Calif.
Filed Dec. 18, 1961, Ser. No. 160,166
9 Claims. (Cl. 254—167)

This invention relates to load bearing devices of the friction brake type. More particularly, this invention relates to friction brake type hoists which include positive holding means in their operating mechanisms for positively, rather than frictionally, sustaining a load supported by the hoist under certain operating conditions.

As used hereinafter, the term "hoist" is intended to include all devices by which a load is supportable or sustainable by a chain-type element operatively engaged with the internal operating mechanism of the device. Additionally, as used hereinafter, the term "chain" is intended to include all load supporting elements which are commonly employed with hoists, such as roller and rollerless-type chain, coil link chain, continuous flexible cables, and the like.

Friction brake hoists have been known and used in the hoist art for sometime. Friction brake hoists are so called because their operating mechanisms include friction discs or equivalent means between operative components of the hoist mechanism which frictionally interconnect such components so that a load may be sustained by the hoist in a frictional manner. That is, the friction means of the hoist selectively insure or preclude movement of hoist components relative to each other.

Heretofore known friction brake hoists have not included means for positively sustaining a load during operation of the hoist or over extended periods of time in which the hoist operating mechanism is at rest but during which the load is to be sustained thereby. That is, known friction brake hoists rely solely on friction means for load sustention.

Accordingly, friction brake hoists have been identified with certain disadvantages which inherently result from their construction. For example, the operating mechanisms of known friction brake hoists under load have a tendency to slip or freeze due to temperature changes, shock loading, over loading, or the like. Additionally, the presence of foreign matter, such as dirt, water and oil, in contact with the friction means of the hoist operating mechanism may also induce the hoist mechanism to slip or freeze under load.

Furthermore, when attempts are made to raise a load with known friction brake type hoists, depending upon the size of the load and the condition of the friction means employed therein, the load will sometimes creep down an increment equal to the lifting increment applied to the hoist so that a net lifting gain of zero is obtained. That is, the friction means may slip during load lifting so that the hoist is ineffective to raise the load.

In this same vein, it has been found that if a load is left on a friction brake hoist over an extended period, such as overnight, the friction means may slip thereby releasing the load, or the friction means may freeze due to its prolonged exposure to the load so that subsequent operation of the hoist is difficult or impossible to obtain.

In spite of illustrative disadvantages such as those enumerated, friction brake hoists have certain definite advantages which make the same attractive to users. For example, friction brake hoists possess the following advantages; simplicity of construction, ease of maintenance, and comparatively low cost.

In the hoist art, attempts to overcome inherent disadvantages of the friction brake type hoists have resulted in the development of so-called pawl and ratchet type hoists which are capable of positively sustaining a load supported by the hoist under all operating conditions.

Various pawl and ratchet type hoists possessing varying degrees of effectiveness are presently available. For an example of a hoist of the pawl and ratchet type which effectively overcomes the aforementioned shortcomings of the friction brake type hoist, reference is directed to my Patent No. 2,967,046, dated January 3, 1961.

However, in spite of the definite load sustaining advantages of pawl and ratchet type hoists over heretofore known friction brake types, pawl and ratchet type hoists embody certain features which make friction brake type hoists more attractive for certain uses. For example, pawl and ratchet type hoists generally are more complex in construction than friction brake type hoists and, therefore, are usually more expensive to manufacture and maintain. Accordingly, even though pawl and ratchet type hoists have definite advantages over friction brake type hoists, a substantial market for friction brake type hoists exists and substantial numbers are sold annually, due to a large extent to their relatively low cost and relative simplicity.

The purpose of this invention is to incorporate certain positive holding advantages of pawl and ratchet type hoists into friction brake type hoists so that many of the undesirable features of friction brake type hoists of the prior art may be overcome. That is, this invention is intended to incorporate into a friction brake type hoist means for positively sustaining the load under certain operating conditions, so that slipping or freezing of the friction means under the conditions above enumerated can be positively precluded.

Accordingly, in view of the foregoing, objects of this invention include the provision in a hoist of the friction brake type of means for positively sustaining a load under certain conditions, such as while the load is being raised by the hoist or while the load is being sustained over extended periods of time; and the provision of positive holding means which is operatively disengageable from the friction means of the hoist operating mechanism so that such friction means may be employed in well known fashion for frictionally sustaining a load during other operating conditions of the hoist, such as during load lowering.

With these and other objects which will become apparent later in mind, attention is directed to the attached drawings which illustrate one embodiment of a friction brake hoist into which this invention is incorporated.

FIG. 1 is an isometric view of a hoist of this invention;

FIG. 2 is a side elevational view of the subject hoist with the operating handle means thereof in one operative position;

FIG. 3 is a side elevational view of the subject hoist with the handle means thereof in another operative position;

FIG. 4 is a sectional view through the subject hoist taken in the plane of line 4—4 of FIG. 3 which illustrates the operating mechanism thereof;

FIG. 5 is a partial sectional view through the handle means of the hoist illustrating the reversible pawl and bi-directional ratchet wheel thereof taken in the plane of line 5—5 of FIG. 4;

FIG. 6 is a partial sectional view taken in the plane of line 6—6 of FIG. 4 showing details of the means for frictionally sustaining a load;

FIG. 7 is a sectional view through the hoist taken in the plane of line 7—7 of FIG. 4 illustrating the positive holding means incorporated into the hoist for positively sustaining a load;

FIG. 8 is a sectional view similar to FIG. 7 showing the positive holding means in disengaged position;

FIG. 9 is a sectional view similar to FIG. 5 showing the reversible pawl of the handle means reversely oriented as compared to FIG. 5.

In summary, the subject positive holding friction brake type hoist includes a casing through which a rotatable shaft extends over which a load supporting chain is operatively engaged. Means is provided in conjunction with the shaft for frictionally sustaining a load during load lowering. Additionally, means is included in the operating mechanism of the hoist for positively sustaining the load during raising thereof and over extended periods of time while the hoist operating mechanism is otherwise at rest.

Both the friction means and the positive holding means to be described include disengageable mechanisms which may be operatively disengaged from the rotatable shaft of the operating mechanism so that the free chain condition may easily be obtained in which the chain may be moved to any desired position without requiring operation of the hoist operating handle means. Such handle means is operatively connected to the shaft for effecting rotation of the same in one of two predetermined directions in accordance with orientation of the reversible pawl means included therein.

In the embodiment illustrated, the positive holding means employed in conjunction with friction brake type hoists comprises a pawl and ratchet arrangement which is effective during raising of the load and during sustention of the load for a given period of time. Such pawl and ratchet arrangement is operatively disengageable so that the friction means is employed to sustain the load during load lowering.

Referring now to FIG. 1, a hoist embodying the subject invention includes a separable hoist casing 1 having a major section 2 and a removable minor section 3 held in operative connection with each other by a series of screws or equivalent fasteners 4. A hook 6 projects from the upper portion of the casing for the well known purpose. A chain 7 having opposite generally parallel reaches 8 and 9 passes through the casing and another hook 10 is connected to the lower end of reach 9 of the chain, as seen in FIG. 3.

To effect movement of the chain through the casing to raise or lower a load or to increase tension on the chain through the operating mechanism of the hoist to be described, operating handle means 11 is provided in conjunction with major casing section 2. Such handle means includes an elongated operating handle 12 having a grip 13' on the free end thereof. To reduce the weight of the handle, the same preferably is hollow. Its upper end is fitted over a boss 13 which projects as part of a third casing section 14. A pin 15 extends through boss 13 and the upper end of handle 12 and maintains the handle operatively connected to boss 13. Comparing FIGS. 2 and 3, it is seen that handle 12 with casing section 14 is oscillatable relative to the other sections of the casing for effecting operation of the hoist in the manner to be described.

Referring now to FIG. 4, the operating mechanism of the hoist which is operable by the handle means includes an elongated shaft 16 which is rotatably mounted in the casing when the respective sections thereof are assembled. One end 17 of the shaft is rotatably positioned in a bearing recess 18 formed in casing section 3 while an intermediate bearing section 19 of the shaft is rotatably supported in a bearing recess 21 in section 2 of the casing.

Handle casing section 14 is provided with a cylindrical projection 22 as seen in FIG. 4, which interfits with an end portion 23 of casing section 2 so that section 14 is rotatable relative to the remainder of the casing.

An enlarged shoulder 24 is provided on shaft 16 adjacent the bearing section 19 thereof to limit axial movement of the shaft in the casing towards the right as viewed in FIG. 4. Additionally, end bearing section 17 of the shaft is engaged in casing section 3 as seen in FIG. 4 so that movement of the shaft to the left when the casing is assembled also is precluded. In this manner, the shaft is rotatable in the casing while undue play is precluded during rotation.

Handle casing section 14, and handle 12 therewith, is maintained in operative engagement with the remainder of the casing by means of an end retainer plate 26 through which a retaining screw 27 passes. Such screw is threadedly received in a threaded bore 28 provided in end 29 of rotatable shaft 16. It should be understood that plate 26 engages end 29 of the shaft and precludes separation of the handle casing section 14 from casing section 2, but does not preclude rotation thereof relative to each other.

Located between bearing end 17 of the shaft and enlarged shoulder 24 is a shaft section with which the load supporting chain is engaged. In the embodiment illustrated, such section comprises a chain sheave 31. The chain 7 illustrated in the drawings is of the roller type and, accordingly, the contour of sheave 31 is appropriately formed to accommodate such a roller type chain. It should be understood, for example, that if a coil type chain were to be employed, a coil chain type sheave of appropriate configuration would be provided on the shaft. Similarly, if a flexible cable were to be employed, a shaft section 31 suitable to accommodate such cable would be provided.

Chain 7 passes over sheave 31 with each of its parallel reaches 8 and 9 passing through appropriate spaced apertures provided in the lower portion of the casing. Upon rotation of shaft 16 in a predetermined direction, the chain will accordingly be moved through the casing to raise or lower the load sustained on the hook 10 provided on the bottom of chain reach 9.

The aforementioned operating handle means also includes a ratchet wheel 36 threadedly engaged with threaded end 29 of shaft 16. Wheel 36 has in its outer periphery a series of spaced bi-directional ratchet teeth 37 (see FIGS. 5 and 9) with which a reversible spring urged pawl 38 is operatively and selectively engageable. Pawl 38 has a tapered end surface 39 which terminates in a shoulder 41.

As seen in FIGS. 5 and 9, pawl 38 is normally resiliently urged by a spring 42 surrounding an extension pin 43 into engagement with ratchet wheel 36. As a result, the ratchet wheel may be rotated in a first direction (clockwise as seen in FIG. 5 when the pawl is engaged as shown in such figure) upon movement of the operating handle 12. Similarly, rotation of wheel 36 in the opposite direction (counterclockwise as seen in FIG. 9 when pawl 38 is reversely oriented as seen in such figure) may be effected upon movement of handle 12. Rotation of wheel 36 in increments in either position of pawl 38 is possible in that the pawl will ride over the teeth as the handle 12 is repositioned for further actuation.

Pawl 38 is operatively maintained in engagement in handle casing section 14 by means of a plug 44 retained in the end of hollow boss 45 projecting from handle section 14. Plug 44 is retained in place by a key 46. Spring 42 is thereby interposed between pawl 38 and the inner face of plug 44. Extension pin 43 of pawl 38 has a handle 47 maintained thereon by key 48. By grasping handle 47 and pulling the same outwardly, pawl 38 may be disengaged from the teeth of the ratchet wheel 36. By rotating handle 47 through 180° when the pawl is withdrawn, the pawl may be moved between the reversed positions of orientation shown in FIGS. 5 and 9 so that the ratchet wheel may be driven in either of two predetermined directions when the handle is pivoted relative to the hoist casing section 2.

Handle 47, as seen in FIGS. 5 and 9, is provided with a projection 49 which normally is received in a seat 50 formed in plug 44. When projection 49 is received in seat 50 in either of the two positions of orientation shown in FIGS. 5 and 9, pawl 38 is let into engagement with the ratchet wheel 36. However, if handle 47 is pulled out and rotated only 90°, the projection 49 will engage with the outer surface 51 of the plug 44, and will thereby maintain pawl 38 out of engagement with the ratchet wheel. The pawl is positioned in this relationship when the free chain condition of the hoist is desired.

From the foregoing it should be understood that with pawl 38 in the position shown in FIG. 5, clockwise rotation of handle 12 in such figure will effect clockwise rotation of ratchet wheel 36 therewith and attendant clockwise rotation of shaft 16 on which wheel 36 is threadedly carried. Furthermore, with the pawl 38 reversely oriented as seen in FIG. 9, clockwise rotation of handle 12 will have no effect other than to cause the pawl to ride over the respective bi-directional teeth of the ratchet wheel 36. However, with the pawl in this orientation, counterclockwise rotation of handle 12 will result in counterclockwise rotation of ratchet wheel 36. But such counterclockwise rotation of wheel 36 will not cause rotation of shaft 16 but will merely move the ratchet wheel over the threads of the shaft to the right in FIG. 4 for a purpose to be described. In this connection, a clearance space 52 is provided between wheel 36 and retaining plate 26 to permit such movement.

Interposed between the ratchet wheel 36 of the handle means and the sheave 31 over which the chain passes are means for frictionally sustaining the load on the chain and additional means for positively sustaining the load on the chain during predetermined operating conditions of the hoist.

As seen in FIG. 4, the means for frictionally maintaining such load includes a boss 53 which projects from casing section 2 and in which a pin extension 54 having a tapered pawl 55 on its inner end is slidably arranged. A plug 56 closes off the outer end of boss 53 and is maintained in place by a pin 57. A spring 58 is interposed between pawl 55 and plug 56 for normally urging the pawl inwardly of the casing. A handle 59 is secured to the outer end of pin extension 54 by means of which pawl 55 may be retracted into the boss 53.

Plug 56 is provided on its outer end with a raised shoulder 60 and handle 59 is provided with a cutout portion 61. As seen in FIG. 4, the shoulder and cutout portion normally cooperate and interfit with each other to let the pawl into its operative position under the urging of spring 58. However, when handle 59 is withdrawn and rotated 90° an inner end 62 of the handle adjacent the cutout portion 61 may be engaged with shoulder 60 of the plug to maintain pawl 55 out of its operative position for a purpose to be described.

Surrounding shaft 16 in alignment with pawl 55 is a ratchet wheel 63 which is freely rotatable relative to the shaft. That is, wheel 63 is not secured to the shaft. Wheel 63 has a series of spaced uni-directional ratchet teeth 64 about its periphery with which pawl 55 is normally engaged. When pawl 55 is let into engagement with ratchet wheel 63, as seen in FIG. 6, rotation of the ratchet wheel in a counterclockwise direction is positively precluded while rotation thereof in a clockwise direction is permitted because the pawl will ride over the ratchet teeth.

Friction means in the form of two separate friction discs 65 and 66 surround shaft 16 and contact the opposite flat sides of ratchet wheel 63. These discs may be of any suitable friction material, such as a rubber-asbestos mixture, or the like. Interposed between friction disc 66 and the aforementioned ratchet wheel 36 is a metal bearing disc 67.

As also seen in FIG. 4, an enlarged annular collar 68 is secured to shaft 16 for rotation therewith. In the embodiment illustrated collar 68 is formed separately from the shaft and held in place for rotation therewith by a pair of keys 69. However, if desired, the collar may be formed in one piece with the shaft during manufacture thereof. Friction disc 65 is interposed between collar 68 and ratchet wheel 63 and is compressible therebetween for the purpose to be described.

Collar 68 forms parts of the aforementioned means for positively sustaining the load which is provided in conjunction with shaft 16. So that collar 68 may perform its intended purpose, as seen in FIGS. 7 and 8, the collar is provided about its periphery with a series of spaced uni-directional ratchet teeth which are oriented in the same direction as the teeth on aforementioned ratchet wheel 63.

Normally a pawl 72 is urged by a spring 73 into engagement with the teeth of ratchet collar 68. Pawl 72 is provided on the end of a pin extension 74 which extends through a boss 76 projecting from casing section 2. Pin 74 extends through a retaining plug 77 and terminates in a handle 78. Handle 78 and plug 77 preferably have cooperable shoulder and cutout portions 79 and 80, respectively (FIG. 8), of the same type described previously with respect to handle 59 operatively connected to pawl 55 of the friction means of the hoist operating mechanism. Accordingly, comparing FIGS. 7 and 8, it is seen that upon rotation of handle 78 through 90° after pawl 72 has been withdrawn from engagement with ratchet collar 68, the pawl may be positively maintained out of engagement with the collar. Both pawls 72 and 55 may similarly be maintained out of engagement with their associated ratchet teeth so that shaft 16 may be freely rotated without restraint therefrom in either direction to permit free chain operation of the hoist.

Because collar 68 is rotatable with and secured directly to the shaft 16, when pawl 72 is engaged with the collar, rotation of the collar and the shaft in a predetermined direction (counterclockwise as viewed in FIGS. 7 and 8) is positively precluded. However, because of the cooperable inclined surfaces provided on the pawl and the ratchet teeth, rotation of the collar and the shaft in the opposite direction (clockwise as seen in FIGS. 7 and 8) is permitted. As a result, with the arrangement illustrated, rotation of the shaft in the clockwise direction may be effected through the operating handle 12 to cause the chain to pass over sheave 31 to effect load raising. During such load raising operation pawl 72 will ride over the respective teeth of the ratchet collar so long as the load is held by the hoist operator through the handle 12.

However, when pawl 72 is engaged with the collar, all counterclockwise rotation of the collar and the shaft is precluded so that any load supported on the chain passing over sheave 31 is positively supported when the handle is not actually being employed to raise the load a given increment. This arrangement positively precludes load slippage during raising of the load and also precludes slippage if a load is sustained by the hoist over a given period of time.

When it is desired to raise the load, handle 12 is rotated in the clockwise direction in FIGS. 2 and 3 when the reversible pawl 38 is engaged as shown in FIG. 5. This rotates shaft 16 through the frictional driving effects of the friction discs and pawls 55 and 72 ride over the respective teeth of ratchet wheel 63 and ratchet collar 68 while the hook 10 on which the load is supported is drawn toward the casing. When the handle has reached the end of a stroke and it is desired to return the same to a convenient position for another cycle of operation, the reversible pawl 38 merely rides over the bi-directional teeth 37 of ratchet wheel 36. During such reverse movement of the handle, the load is positively maintained by engagement of pawl 72 with ratchet collar 68. Accordingly, by repeating the handle rotation operation, the load may be raised in increments to any amount desired.

Load lowering is positively precluded so long as pawl 72 is engaged with a tooth of ratchet collar 68. To permit lowering the load, it is first necessary to disengage pawl 72 from ratchet collar 68 by withdrawing the pawl and maintaining the same out of engagement with the ratchet wheel by employing handle 78 in the manner shown in FIG. 8. When pawl 72 is thus disengaged, the friction means of the hoist is operable to frictionally sustain the load or to allow the load to lower under its own weight, depending upon the extent of the compressive forces exerted on the respective friction discs 65 and 66 by handle ratchet wheel 36 and bearing disc 67, and depending also upon the resultant extent of the frictional forces applied by the friction discs to ratchet wheel 63.

When pawl 72 is disengaged from ratchet collar 68 and sufficient compressive forces are exerted on the friction discs 65 and 66 by handle ratchet wheel 36, the load is frictionally sustained by means of the friction disc 65 cooperating with and frictionally interconnecting ratchet collar 68 on the shaft with ratchet wheel 63. Because pawl 55 is engaged with a predetermined one of the ratchet teeth of wheel 63 as seen in FIG. 6, rotation of the ratchet wheel 63 in the counterclockwise direction is positively precluded. Accordingly, when friction disc 65 is compressed and is positively wedged and clamped between the collar 68 and ratchet wheel 63, rotation of the collar, and the shaft therewith, is frictionally precluded. That is, wheel 63 is precluded from rotation by pawl 55 and rotation of the shaft is also precluded due to the frictional engagement of collar 68 with wheel 63 through friction disc 65.

Load lowering, i.e., rotation of shaft 16 in the counterclockwise direction in FIG. 6, may be effected if the frictional interconnection between collar 68 and ratchet wheel 63 is minimized so that wheel 63 is not effective to preclude rotation of the shaft. The clamping pressure (that is, compressive forces) on the friction discs may be reduced or removed by rotating handle ratchet wheel 36 counterclockwise as viewed in FIGS. 5 and 9, thus moving ratchet wheel 63 to the right as viewed in FIG. 4 so that bearing disc 67 also may move slightly to the right as seen in FIG. 4 to take off or reduce the frictional pressure applied by friction disc 66 to the right side of ratchet wheel 63. Rotation of handle ratchet wheel 36 counterclockwise as described may be effected merely by positioning the reversible pawl 38 in the position shown in FIG. 9 and pivoting handle 12 in the counterclockwise direction. This effects rotation of ratchet wheel 36 on the threaded end 29 of the shaft to release the compressive forces on the friction discs.

While ratchet wheel 36 is being rotated a predetermined amount, bearing disc 67 and friction disc 66 may move slightly to the right, as may ratchet wheel 63. This releases the compressive forces on friction disc 65 so that collar 68 and shaft 16 may rotate counterclockwise as viewed in FIGS. 5 through 9 independently of ratchet wheel 63 to allow the load to descend under its own weight. The rate of descent of the load will be determined by the rate at which and the extent to which the compressive forces on the friction discs are released.

By repeating pivotal operation of handle 12, the load may be lowered in increments to any degree desired with the load being alternately frictionally sustained and released during such operation.

Normally, pawl 55 of the friction means remains in engagement with ratchet wheel 63 and is withdrawn therefrom only to permit the free chain condition to be obtained. To obtain such free chain conditions, all three pawls described are disengaged from their respective ratchet teeth.

The positive holding pawl 72 adds highly desirable positive holding features to heretofore known friction brake hoists to positively preclude load slippage, freezing or load dropping under conditions frequently encountered with conventional friction brake hoists. Because the load is positively held during each increment of load raising by the positive holding pawl 72, net gain in load lifting are insured. Also, if a load is left on the hoist over a period of time, load slipping cannot occur. Furthermore, because of the positive holding features provided by the hoist of this invention, a much safer friction brake type hoist than has heretofore been known is produced and the comparatively low cost characteristic of friction brake type hoists is only slightly increased by the addition thereto of the positive holding pawl and ratchet means.

Having thus made a full disclosure of a friction brake type hoist in which means is provided for positively supporting the load under load raising and sustaining conditions, reference is directed to the appended claims. Modifications to the hoist claimed which may become apparent to one skilled in the art are contemplated as being included within the scope of protection afforded by such claims.

I claim:

1. A friction brake type hoist comprising a rotatable shaft with which a load supporting chain is operatively engageable, means normally frictionally precluding rotation of said shaft in a predetermined direction, and other means normally operatively engaged with said shaft irrespective of the position of engagement of said chain with said shaft, said other means being selectively disengageable from operative engagement with said shaft, said other means positively precluding rotation of said shaft in said predetermined direction when such other means is operatively engaged with said shaft.

2. A friction brake type hoist comprising a casing, a rotatable shaft in said casing with which a load supporting chain is operatively engaged, means normally operatively engaged with said shaft for frictionally precluding rotation of said shaft in a predetermined direction, and other means for positively precluding rotation of said shaft in said predetermined direction; said other means comprising a toothed ratchet collar secured on said shaft, said collar having a series of ratchet teeth positioned in spaced relationship about the full periphery thereof, a disengageable pawl normally engaged with said collar, said pawl being spring urged into engagement with said collar to positively preclude rotation of said collar and said shaft when said pawl is engaged with the teeth of said collar, and handle means operatively connected with said pawl and located outside said casing for effecting selective disengagement of said pawl from said toothed ratchet collar.

3. A friction brake type hoist comprising a casing, a shaft rotatable in said casing, a chain operatively engaged with said shaft and movable thereby in one direction in response to rotation of said shaft in a first direction and in an opposite direction in response to rotation of said shaft in a second direction, a handle operatively engaged with said shaft for selectively rotating said shaft in either of said directions, first selectively disengageable pawl and ratchet means in conjunction with said shaft, second selectively disengageable pawl and ratchet means in conjunction with said shaft, and friction means operatively interposed between said shaft and said second pawl and ratchet means; said first pawl and ratchet means when operatively engaged with said shaft positively precluding rotation of said shaft in said first direction, said first pawl and ratchet means including handle structure positioned outside said casing for effecting selective operative disengagement of said first pawl and ratchet means, said second pawl and ratchet means when engaged precluding rotation of said shaft in said first direction when said friction means is firmly clamped between said shaft and said second pawl and ratchet means, whereby rotation of said shaft in said first direction is precluded frictionally when said first pawl and ratchet means is disengaged and said second pawl and ratchet means is engaged.

4. A friction brake type hoist comprising a casing, a rotatable shaft in said casing with which a load supporting chain is engageable, handle means operatively engageable with said shaft for effecting rotation thereof in one of two predetermined directions to effect movement of said load supporting chain up and down to raise and lower a load, a toothed ratched wheel surrounding said shaft and rotatable relative thereto, a first disengageable pawl normally engaged with said ratchet wheel for precluding rotation thereof in a first direction when engaged therewith, a toothed collar on said shaft which is secured thereto and rotatable therewith, said collar having a series of spaced ratchet teeth positioned about the full periphery thereof, a second disengageable pawl normally engaged with one of said ratchet teeth of said collar for positively precluding rotation of said collar and said shaft in said first direction when said second pawl is thus engaged with said collar, friction means operatively interposed between said collar and said ratchet wheel and between said ratchet wheel and said handle means, said friction means frictionally connecting said ratchet wheel with said collar whereby rotation of said shaft in said first direction may be frictionally precluded through engagement of said first pawl with said ratchet wheel when said friction means is tightly clamped between said wheel and said collar and between said wheel and said handle means respectively, said first and second pawls riding over said ratchet wheel and said collar when said handle means is actuated to rotate said shaft in a second direction opposite to said first direction, said second pawl positively precluding rotation of said shaft in said first direction when said second pawl is engaged with said collar, and means connected with said second pawl which is accessible from outside said casing for selectively maintaining said second pawl out of engagement with said collar so that rotation of said shaft in said first direction may be frictionally precluded.

5. A non-slip friction brake type hoist comprising a casing, a rotatable shaft in said casing with which a load supporting chain is engaged, a handle operatively engaged with said shaft for effecting rotation thereof in either of two predetermined directions to effect movement of said load supporting chain up and down to raise and lower a load supported on said chain, a toothed ratchet wheel surrounding said shaft and rotatable relative thereto and independently thereof, a first pawl normally engaged with said ratchet wheel for precluding rotation thereof in one direction when engaged therewith irrespective of rotation of said shaft relative to said wheel, a toothed collar on said shaft secured thereto and rotatable therewith, said collar having a series of spaced ratchet teeth positioned about the full periphery thereof, a second pawl normally engaged with one of said ratchet teeth of said collar for precluding rotation of said collar and said shaft in said one direction when said second pawl is engaged with said collar, friction means operatively interposed between said collar and said ratchet wheel and between said wheel and said handle means for frictionally connecting said ratchet wheel with said shaft for rotation therewith and for frictionally precluding rotation of said shaft when said ratchet wheel is precluded from rotation by said first pawl, said first and second pawls riding over said ratchet wheel and said collar when said handle is actuated to rotate said shaft in a second direction opposite to said first direction, said second pawl positively precluding rotation of said shaft in said first direction when said second pawl is engaged with said collar, and means connected with said second pawl which is accessible from outside said casing for selectively maintaining said second pawl out of engagement with said collar so that rotation of said shaft in said first direction may be frictionally precluded through said friction means clamped between said collar and said ratchet wheel when said first pawl is engaged with said wheel.

6. In a friction brake type hoist which comprises a casing, a rotatable shaft in said casing with which a load supporting chain is to be engaged, handle means operatively engageable with said shaft for effecting rotation thereof in either of two predetermined directions to effect movement of said load supporting chain up and down to raise and lower a load, a toothed ratchet wheel surrounding said shaft and rotatable relative thereto and independently thereof, a pawl normally engaged with said ratchet wheel for precluding rotation thereof, a collar on said shaft rotatable therewith, friction means operatively interposed between said collar and said ratchet wheel and between said ratchet wheel and said handle means for frictionally precluding rotation of said shaft in a first direction when said pawl is engaged with said ratchet wheel; means for positively precluding rotation of said shaft in said first direction, comprising a series of teeth on said collar generally equally spaced about the full periphery thereof, and a second pawl normally engaged with one of the teeth on said collar, said second pawl when the same is engaged with such one of said collar teeth positively precluding rotation of said collar and said shaft, said second pawl being disengageable from said collar so that rotation of said shaft in said first direction may be precluded only frictionally by said first pawl through said ratchet wheel and friction means; and means operatively connected with said second pawl and accessible from the outside of said casing for selectively disengaging said second pawl from said collar and for maintaining said second pawl out of engagement with said collar.

7. A friction brake type hoist in which a load is supported positively during load raising, said hoist comprising a casing, a rotatable shaft extending through said casing, a chain sheave on one end of said shaft, a chain passing over said sheave on which a load is to be supported, the other end of said shaft being threaded, a first ratchet wheel threadedly engaged on said other shaft end, bi-directional ratchet teeth on said first wheel, an operating handle rotatable relative to said first wheel, a reversible pawl retractable from outside said casing normally engaged with said first wheel for effecting rotation thereof in either of two directions in accordance with the orientation of said reversible pawl with the teeth of said first wheel, a second ratchet wheel surrounding said shaft and being rotatable thereon independently thereof, uni-directional ratchet teeth on said second wheel, a second pawl retractable from outside said casing normally engaged with said second wheel, a toothed ratchet collar secured to said shaft for rotation therewith in spaced relationship relative to said sheave, said collar having a series of uni-directional ratchet teeth positioned in spaced relationship about the full periphery of said collar and oriented in accordance with the teeth on said second wheel, a third pawl retractable from outside said casing normally engaged with said collar, spring means normally urging said third pawl into engagement with said collar, handle means connected with said third pawl and located outside said casing for effecting retraction of said third pawl from engagement with said collar against the urging of said spring means, and a pair of friction discs surrounding said shaft, one of said discs being interposed between said collar and said second wheel, the other of said discs being interposed between said second wheel and said first wheel; said shaft being rotatable in a first direction to raise said load when said handle is actuated in a first direction to rotate said first wheel and said shaft therewith, said second and third pawls riding over the teeth of said second wheel and said collar during such rotation, reverse rotation of said shaft during load raising being positively precluded by engagement of said third pawl with the teeth of said collar, said third pawl being disengageable from said collar so that said load may be supported frictionally during load lowering.

8. A combined positive holding and friction brake type hoist which includes a shaft in a casing over which a load supporting chain passes, friction means operatively connected with said shaft for normally frictionally precluding rotation of said shaft in one direction so that a load on said chain may be frictionally supported, and pawl and ratchet means in conjunction with said shaft and operatively connected therewith for positively precluding rotation of said shaft in said one direction so that said load may be supported positively and without slippage during operation of said hoist to raise said load and so that said load may be sustained by said hoist without slippage over extended periods, said pawl and ratchet means being free of direct contacting engagement with said chain under all operating conditions, and means operable from outside said casing for selectively and operatively disengaging said pawl and ratchet means from said shaft.

9. A friction brake type hoist by which a load is supportable positively against slipping over extended periods and during load raising, said hoist comprising a casing, a rotatable shaft in said casing having a section thereon with which a load supporting chain is operatively engaged, handle means operatively connected with said shaft for rotating the shaft in opposite directions to effect load raising and lowering, friction means operatively interposed between said handle means and said shaft section for frictionally effecting rotation of said shaft in one of said opposite directions during load raising and for frictionally precluding rotation of said shaft in the other of said opposite directions so that a load engaged with said chain may be frictionally supported by said hoist, and positive holding means in conjunction with said shaft operatively interposed between said handle means and said shaft section for positively precluding rotation of said shaft in said other direction so that a load engaged with said chain may be positively supported by said hoist without slippage over extended periods and during operation of said hoist to raise such load; said positive holding means comprising normally interengaged pawl and ratchet mechanism including a rotatable ratchet collar spaced from said shaft section and operatively connected with said shaft so that rotation of said shaft is positively precluded in said other direction when rotation of said collar is precluded, said collar having a series of ratchet teeth positioned in spaced relationship around the periphery thereof, a pawl normally directly engaged with said collar in one of said teeth thereon so that rotation of said collar and said shaft is positively precluded thereby, means urging said pawl into such direct engagement with said toothed collar irrespective of the position of said chain relative to said shaft section, and control means operatively connected with said pawl within said casing and projecting from said casing, said control means being readily accessible externally of said casing so that the same may be employed for disengaging selectively said pawl from engagement with said toothed collar to permit rotation of said shaft in said other direction during lowering of a load under frictionally controlled conditions.

References Cited by the Examiner

UNITED STATES PATENTS

| | | | |
|---|---|---|---|
| 2,270,271 | 1/1942 | Coffing | 254—167 |
| 2,343,884 | 3/1944 | Coffing | 254—167 |

SAMUEL F. COLEMAN, *Primary Examiner.*

JOSEPH P. STRIZAK, *Examiner.*